Nov. 21, 1933.                M. GARLAND                 1,936,506
        TEMPERATURE CONTROL AND VENTILATING SYSTEM FOR VEHICLES
                      Filed Aug. 28, 1931         2 Sheets-Sheet 1
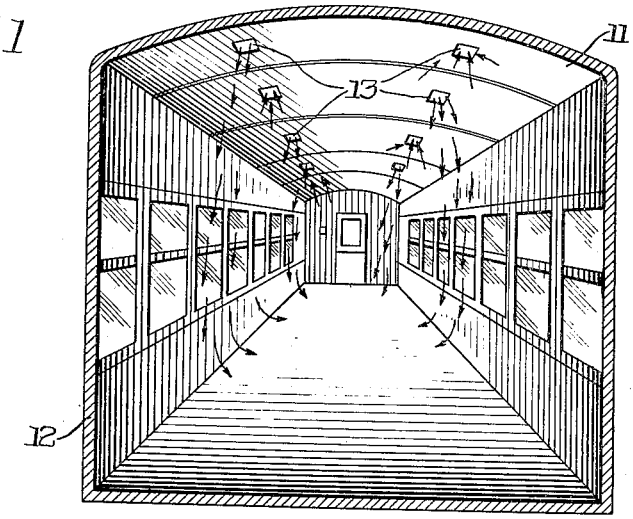
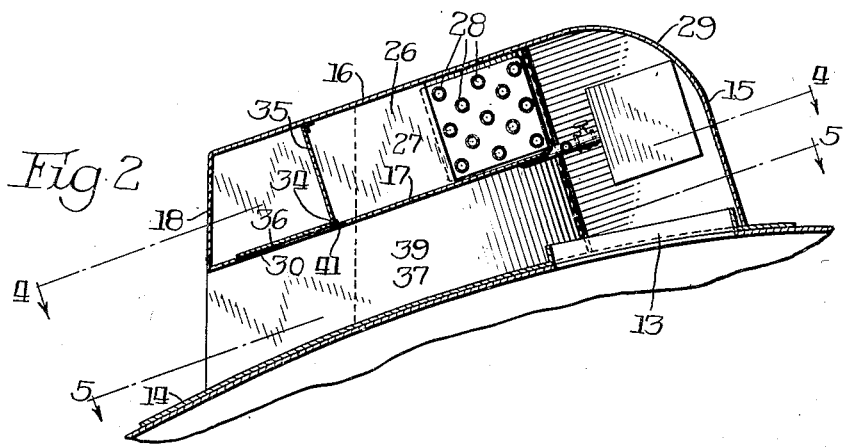
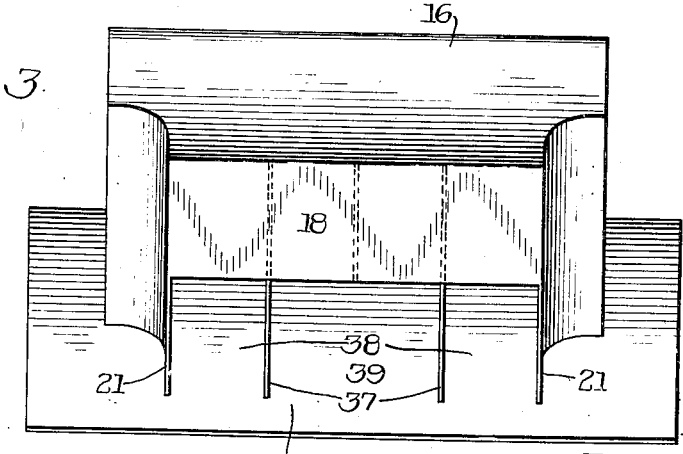
Inventor
Mather Garland
By Walter M. Fuller Atty Nov. 21, 1933.   M. GARLAND   1,936,506
TEMPERATURE CONTROL AND VENTILATING SYSTEM FOR VEHICLES
Filed Aug. 28, 1931
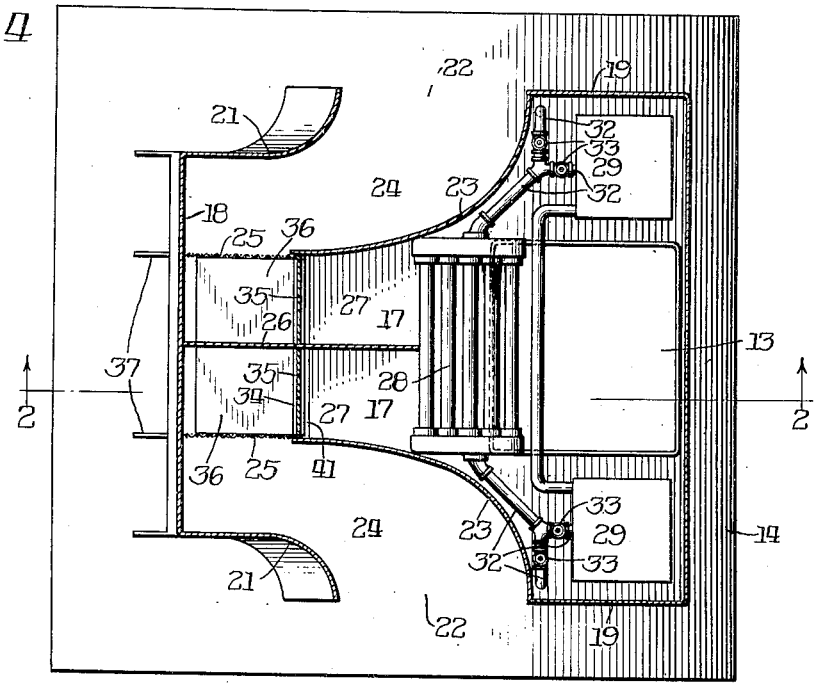
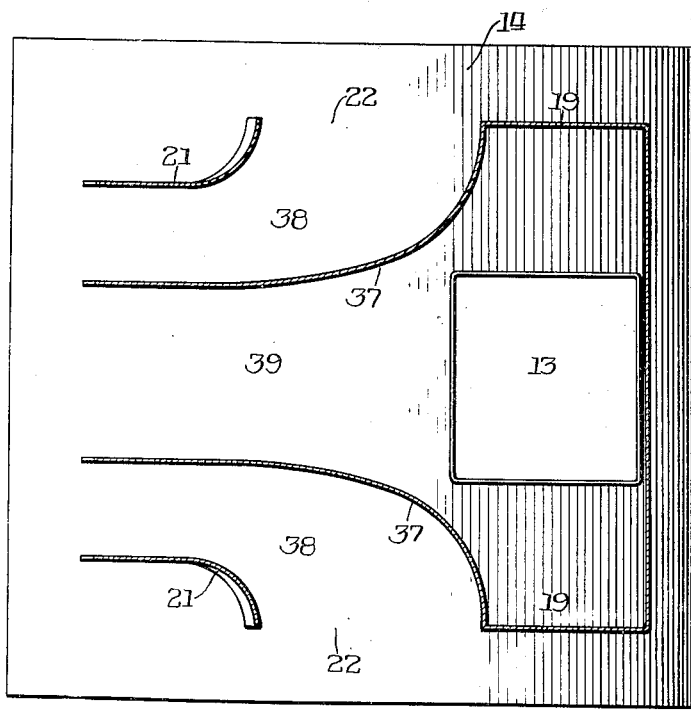

Patented Nov. 21, 1933

1,936,506

UNITED STATES PATENT OFFICE 1,936,506

TEMPERATURE CONTROL AND VENTILATING SYSTEM FOR VEHICLES

Mather Garland, Chicago, Ill., assignor to Garland Ventilator Company, Chicago, Ill., a corporation of Illinois Application August 28, 1931. Serial No. 559,953

2 Claims. (Cl. 62—117)

The present invention pertains or relates to the conditioning of the air of vehicles, such as railway cars, automobile busses, etc. and concerns more particularly the ventilating of such vehicles and at the same time cooling, heating or moistening the air thereof as may be required for the comfort of the occupants.

Up to the present time substantial difficulty has been experienced in maintaining the interior of railway passenger cars properly heated or cooled and also reasonably clean.

Great annoyance has been experienced by the passengers because of the entrance of dirt, dust and cinders into the cars especially in the summer when the windows are open and also by reason of objectionable temperatures of the air.

Usually such cars have been either too hot or too cold, and, frequently, unnecessarily dirty.

The present invention aims to satisfactorily overcome these several difficulties in a simple, effective and economic manner.

In general, it may be stated that the invention contemplates the admission of fresh outside air into the moving vehicle by reason of the travel of the latter and such air is either cooled or heated as occasion requires.

Various other features of improvement and advantage of the invention will become apparent to those skilled in this art from a consideration of the present, preferred embodiment of the invention illustrated in detail in the accompanying drawings forming a part of the specification, and to which reference should be had in connection with the following detailed description, like reference numerals having been employed throughout the several views to designate the same structural parts.

In the drawings,—

Figure 1 is a perspective view of the inside of a railway car fitted with the new system;

Figure 2 is a vertical cross-section through the air-conditioning appliance on line 2—2 of Figure 4;

Figure 3 is an elevation of the improved structure;

Figure 4 is a horizontal section on line 4—4 of Figure 2; and

Figure 5 is a horizontal section on line 5—5 of Figure 2.

Referring to these drawings, it will be observed that the roof portion 11 of the railway car 12 is provided with two longitudinal rows of openings 13, 13, each opening being equipped with one of the improved ventilators or air conditioners fitted with suitable cooling or heating means described below.

When these appliances are in operation the alternate ones cause the entrance of the fresh outside air into the car which finds its escape again outside of the car through the remaining ones, and for purposes hereinbelow stated, this action is occasionally reversed.

Each such ventilator or air conditioner, which is preferably but not necessarily made of sheet-metal, has a curved or other suitably shaped base 14 designed and adapted to rest on, and to be secured to, the top surface of the car roof, and it is provided with a suitable aperture through which upwardly projects the flange surrounding the corresponding roof opening 13 (see Fig. 2).

Secured to said base plate 14, as by welding or otherwise, is a bent or curved plate which forms the back-wall 15 and the downwardly outwardly sloping top portion of the structure which includes also an intermediate plate 17 about midway between the top and bottom plates and parallel to them but of less length than the top as is fully shown in Fig. 2.

The top plate 16 is bent at its lower outer part to provide a wall 18, which, at that point, closes the space between the two plates 16 and 17.

At each end of the device, at its upper half, it has a straight end-wall 19 and a curved wall 21 and an opening 22 between their adjacent parts, wall 19 connecting with a curved wall 23 inside of the structure and providing a curved passage 24 between itself and the opposite wall 21, all as is clearly depicted in Fig. 4, wall 23 terminating some distance short of the front wall 18 to provide a port or opening between them which is covered by a screen 25.

A central, upright division-wall 26 extends inwardly from the front plate 18 and reaches from plate 17 to plate 16, thereby affording two parallel passages 27, 27, which, at their outer ends, connect directly with the adjacent ends of conduits 24, 24, through the screens 25, 25.

At the inner end of the passages I provide a series of pipes or tubes 28, 28, around which the entering outside air must pass, and these pipes may be supplied with a cooling or refrigerating medium supplied by one or more cooling units 29, 29, shown diagrammatically, or these pipes or tubes may be supplied with steam or hot water as a heating agency by means of the pipes 32 and by proper manipulation of the valves 33, the piping system being appropriately connected to any source of a suitable heating element.

The floor of each passage or conduit 27, formed by the intermediate wall or plate 17, is apertured at 30, and each such passage is fitted with a right-angle shutter or valve mounted on a hinge shaft at 34, the two sections of each such valve being characterized 35, 36.

Such two valves are mounted on the same hinge shaft 34 so that when the latter is turned by any appropriate means not shown, the pair of valves may be swung up to close the two passages 27, 27 or may be rocked down to open such passages.

Both the two end-walls 19, 19, and the two curved walls 21, 21 extend down to the base plate 14, and the space below the division wall 17 is provided with two curved plates or walls 37, 37 substantially parallel to the walls 21, 21 and reaching from the front of the ventilator to the edge of the walls 19 as is fully pictorially presented in Fig. 5.

Thus the lower half of the apparatus has the two curved passages 38, 38 and between them the straight conduit 39 connecting with the aperture 13.

Obviously when the angular shutters or valves are rocked downward their two parts 36, 36 substantially close this middle passage 39.

Just to the rear of the hinge shaft 34 the wall 17 has a narrow slot 41 extended across the parallel passages 27, 27 for a purpose hereinafter indicated.

These appliances operate practically as follows:

Assuming that the valves 35—36 are rocked down so that the passages 27, 27 are open and conduit 39 is closed and hence inoperative, and, assuming that the pipes 28 are supplied with the cooling medium, when the car is in motion the outside air enters one of the passages 24 through its open mouth 22, the particular one of the pair depending upon the direction of travel of the car.

Such air flows through the conduit 24, through the screen 25 which prevents the entrance of cinders, dirt, etc., through the passage 27, around the pipes 28 and down through the roof aperture 13 into the interior of the car.

Others of the ventilators are at the same time exhausting or withdrawing air from the car in a way about to be described in connection with this ventilator so that the occupants of the car are supplied with an adequate quantity of cooled clean air.

The screen precludes the admittance of any of the coarser particles of dirt and the finer dirt and dust adheres to the frost and moisture which is present on the outer surfaces of the cooled pipes or tubes by reason of the condensation from the atmosphere.

In this way such dirt and dust is restrained from entrance into the interior of the car.

In time such pipes become sufficiently cooled or covered with the frost and adhered dust that defrosting is desirable.

Then the shutters or valves of all of the ventilators are reversed, half of them, including the one under consideration, are rocked up and the other half swung down so that those ventilators which were previously admitting air into the car are now discharging and exhausting it and those which before were exhausting will now admit the outer air.

Now in the ventilator which we are particularly studying, the two passages 27 are closed so that no air enters the car therethrough and the conduit 39 is open, whereby the air flowing through the curved passage 38, the particular one depending upon the direction of movement of the vehicle, and delivered from its outer mouth or exit next to the passage 39 sucks the air from the car out through aperture 13 and through such passage, a portion of such more or less heated discharging air passing up around the tubes or pipes 28 and causing their defrosting, the dirty water being thus caused to drain from the exterior surfaces of the pipes.

Such delivered water charged with the captured dust and dirt drains down the top of wall 17, down through the slot 41 and down the inclined base plate out of the ventilator.

After the defrosting has been accomplished, the shutters or valves are again reversed and the operation repeated whereby the car continually receives a suitable supply of cleaned cool air which is constantly being discharged from the car.

The units which furnish the cooling medium to the pipes may be in the ventilators as shown or inside of the car, or a single source may supply all of the ventilator pipes or tubes.

In winter, steam or hot water or other heating agency may be used in the pipes by proper manipulation of the valves to warm or heat the air before it enters the car, and, if desired, all of the ventilators may then be so used simultaneously, the air finding exit from the car by other means, such as through cracks and crevices around windows, doors, etc.

Or some of the ventilators may be used with the heating means and a few others employed to exhaust the air.

Those acquainted with this art will readily understand that the invention as herein described and illustrated and as claimed hereinafter is not limited or restricted to the details of structure shown and that the invention may be incorporated satisfactorily in various physical forms without the loss of any advantages accruing from the employment of the fundamental principles involved.

I claim:

1. In an air-conditioning ventilator for use on vehicles, the combination of means to cause external air to enter the vehicle, means in the path of flow of such entering air to cool the air inflowing through the ventilator, means to exhaust air from the vehicle, a valve to render either one of said air-inlet or air-exhaust means operative singly, said air cooling means being located in the path of at least a portion of said exhausting air, whereby said cooling means may be defrosted thereby, and means to drain away the water resulting from such defrosting.

2. The structure specified in claim 1 in which the means to cause the external air to enter the vehicle and the means to exhaust air from the vehicle are both rendered operative due to the travel of the vehicle.

MATHER GARLAND.